(12) United States Patent
Verhaar

(10) Patent No.: US 8,188,384 B2
(45) Date of Patent: May 29, 2012

(54) WEIGHING CONVEYOR BELT WITH FLEXIBLE TRANSITION AREA TO PRE-TENSION THE BELT

(75) Inventor: Arie Hendrik Verhaar, Leerdam (NL)

(73) Assignee: Rademaker B.V., Culemborg (NL)

( * ) Notice: Subject to any disclaimer, the term of this patent is extended or adjusted under 35 U.S.C. 154(b) by 293 days.

(21) Appl. No.: 12/437,386

(22) Filed: May 7, 2009

(65) Prior Publication Data

US 2009/0277693 A1    Nov. 12, 2009

(30) Foreign Application Priority Data

May 9, 2008 (EP) .................................... 08008720

(51) Int. Cl.
*G01G 11/00* (2006.01)
*B65G 15/30* (2006.01)

(52) U.S. Cl. .......... 177/119; 198/844.1; 198/845; 198/847; 198/834; 198/835

(58) Field of Classification Search ............... 198/844.1, 198/845, 847, 834, 835; 177/119, 145
See application file for complete search history.

(56) References Cited

U.S. PATENT DOCUMENTS

| | | | | |
|---|---|---|---|---|
| 3,015,381 A | * | 1/1962 | Mohwinkel et al. | 198/834 |
| 3,180,475 A | * | 4/1965 | Del Rosso | 177/145 |
| 3,405,842 A | | 10/1968 | Wahl et al. | |
| 3,980,174 A | * | 9/1976 | Conrad | 198/835 |
| 3,980,180 A | * | 9/1976 | Jamieson | 209/565 |
| 4,133,455 A | | 1/1979 | Moser | |
| 4,282,971 A | * | 8/1981 | Becker | 198/846 |
| 4,449,958 A | * | 5/1984 | Conrad | 474/205 |
| 4,557,341 A | * | 12/1985 | Söderholm | 177/16 |
| 4,747,747 A | | 5/1988 | Fusco et al. | |
| 4,880,109 A | * | 11/1989 | Sarasola | 198/833 |
| 5,170,857 A | * | 12/1992 | Phillips et al. | 177/145 |
| 5,199,552 A | * | 4/1993 | Dauchez | 198/834 |
| 5,326,938 A | * | 7/1994 | Tolson | 177/145 |
| 5,696,354 A | * | 12/1997 | Linville et al. | 177/145 |
| 6,545,231 B1 | * | 4/2003 | Hafner | 177/119 |
| 6,564,932 B2 | * | 5/2003 | Itoh | 198/835 |

(Continued)

FOREIGN PATENT DOCUMENTS

EP     0 484 944 A1    4/1992

(Continued)

*Primary Examiner* — Randy W Gibson
(74) *Attorney, Agent, or Firm* — Morgan Lewis & Bockius LLP; Richard F. Trecartin; Victor E. Johnson

(57) ABSTRACT

One problem with weighing conveyors is that the tension of the conveyor belt, needed to allow the belt to be driven, inadvertently reduces the degree of sagging of the belt caused by the mass of the product on the belt, which affects weighing accuracy, as this pre-tensioning of the belt inadvertently supports some of the weight of the product being transported, and this tension supported fraction of the weight cannot be sensed by the load cell supporting the middle section of the belt. In a preferred embodiment, a flexible transition area is formed in-between the outer edges of the belt and the middle, product transport area, wherein the transition area comprises openings that serve to weaken the belt locally, such that a pre-tensioning of the middle part of the conveyor belt is reduced; this allows the middle part of the conveyor belt to hang substantially slack even as the outer edges of the conveyor belt are driven.

19 Claims, 4 Drawing Sheets

U.S. PATENT DOCUMENTS

| | | | |
|---|---|---|---|
| 6,964,550 B2 * | 11/2005 | Hafner | 414/21 |
| 7,015,400 B2 * | 3/2006 | Olafsson et al. | 177/119 |
| 7,841,463 B2 * | 11/2010 | DeGroot | 198/835 |
| 7,850,562 B2 * | 12/2010 | DeGroot | 474/153 |
| 7,967,131 B2 * | 6/2011 | DeGroot | 198/835 |
| 2002/0134651 A1 * | 9/2002 | Itoh | 198/835 |
| 2004/0238232 A1 * | 12/2004 | Olafsson et al. | 177/145 |
| 2009/0078544 A1 * | 3/2009 | Messick et al. | 198/834 |

FOREIGN PATENT DOCUMENTS

| | | |
|---|---|---|
| JP | 63-27314 A | 2/1988 |
| JP | 06-56237 A * | 8/1992 |

* cited by examiner

WEIGHING CONVEYOR BELT WITH FLEXIBLE TRANSITION AREA TO PRE-TENSION THE BELT

This application claims priority to European Patent Application No. 08008720 filed May 9, 2008, the entire contents of which is incorporated herein by this reference.

The present invention relates to an apparatus and a method for weighing a product flow. The invention relates more particularly to the weighing of a substantially continuously advancing product flow, wherein the product flow is measured while it passes over the weighing location.

It is noted that the term product flow according to the present invention can be a number of separate products as well as a continuous flow of a medium, such as for instance a dough mass.

Weighing apparatus are known from the prior art which comprise conveyor belts running over a rotatable weighing roller. A drawback of such known weighing apparatus is however that the weighing accuracy is not always sufficient for industrial applications. There is a need for more accurate weighing apparatus.

It is an object of the present invention to provide an apparatus and method for weighing a product flow, wherein the prior art problems are at least largely obviated, and wherein particularly a weighing is possible which is more accurate than with currently known apparatus.

This object is achieved with the apparatus for weighing a product flow according to the present invention, comprising an endless conveyor belt for transporting the product flow thereon in a transport direction, wherein a width direction extends in an imaginary transport plane substantially transversely of the transport direction, and wherein a carrying direction extends substantially transversely of the transport plane, wherein one or more transition parts are arranged slightly inward of the outer edges in the width direction, wherein a middle part is situated between the transition parts, and wherein the transition part is adapted to provide the middle part with a substantially flexible suspension in the carrying direction and/or the transport direction of the conveyor belt relative to the outer edges.

The invention is based on the insight that a pretensioning of the conveyor belt reduces the degree of sagging of the conveyor belt as a result of the mass of the product flow transported over the belt. The pretensioning therefore has an adverse effect on the measuring accuracy of the weighing.

Because the belt tension in transporting direction and in the carrying direction transversely of the transporting direction is kept low according to the invention, the middle part of the conveyor belt can hang substantially slack while the conveyor belt is driven. This has a minimal effect on the weighing signal during driving of the conveyor belt. The outer edges of the conveyor belt can be driven such that the necessary traction can be transmitted. The conveyor belt according to the present invention provides the option of weighing with a high accuracy of measurement, while sufficient traction for driving the conveyor belt is maintained. In addition, the conveyor belt is robust, whereby the long lifespan desirable for industrial applications, similar to that of "normal" conveyor belts, is retained.

According to a preferred embodiment of the conveyor belt, the outer edges of the conveyor belt are strengthened in order to be able to transmit the required traction.

According to a further preferred embodiment of the conveyor belt, the outer edges comprise a thickened portion. In addition to providing more stiffness, such a thickened portion also ensures that the conveyor belt moves slightly clear of reversing rollers of a weighing apparatus in which the conveyor belt can be applied. A pretensioning of the conveyor belt in a weighing apparatus is hereby prevented.

According to a further preferred embodiment, the outer edges of the conveyor belt comprise a toothed belt. This toothed belt provides on the one hand a low-maintenance and reliable driving on the outer edge of the conveyor belt, and can on the other hand also provide a desired thickening which prevents pretensioning when applied in a weighing apparatus with reversing rollers of constant diameter.

According to a further preferred embodiment, the transition part of the conveyor belt comprises openings. Due to openings being arranged therein, the conveyor belt is weakened locally such that a pretensioning of the middle part of the conveyor belt is prevented. The material present between the openings arranged in the conveyor belt is however strong enough to transmit a displacement of the drivable outer edge of the conveyor belt to the middle part of the conveyor belt on which the product flow is transported.

According to a further preferred embodiment, the openings in the conveyor belt comprise a parallelogram shape. This shape has been found to be particularly favourable for slack suspension of the middle part relative to the outer edges, since the material present between the openings can be oriented in favourable manner. A desirable transmission of forces from the outer edges to the middle part can hereby be obtained.

According to yet another preferred embodiment, the corners of the parallelogram shape are slightly rounded in order to prevent peak stresses in the material of the conveyor belt. This prevents tearing.

According to yet another further preferred embodiment, the material present between adjacent parallelogram-shaped openings comprises a pull member which is adapted to transmit a pulling force from the outer edge drivable in transporting direction onto a middle part of the conveyor belt, in order to also make the middle part of the conveyor belt with the product flow for transporting drivable in the transport direction.

According to yet another preferred embodiment, the material present between adjacent parallelogram-shaped openings comprises a pull member which forms an angle between 90° and 180° with the transport direction. At an angle of between 90° and 180° the pull member points rearward relative to the transport direction, whereby the pull members are under strain of tension when the outer edge is driven. When the outer edge is driven, the pull members pull along the middle part of the conveyor belt.

The angles of the parallelogram shapes define the oblique position of the material between the parallelogram shapes. The angle of this oblique position determines how the driving force exerted on the outer edge of the conveyor belt is resolved into vector components and transmitted by the pull members from the outer edge to the middle part of the conveyor belt. The width of the material between two adjacent parallelogram-shaped openings is also a parameter with which the degree of elimination of pretensioning from the middle part of the conveyor belt can be controlled.

According to yet another preferred embodiment of the conveyor belt, the transition part comprises a strip of material which is more flexible and/or more elastic than the material of the conveyor belt, in order to connect the middle part in substantially slack manner to the outer edges. This more flexible strip is for instance manufactured from another material, given a locally thinner form or optionally processed such that the flexibility, elasticity etc. are influenced in the desired manner. Since it is possible to dispense with the arranging of openings when a strip of more flexible material is applied, the advantage can be gained that fouling is prevented and that a conveyor belt need possibly take a less wide form, this reducing the required dimensions of the apparatus.

According to yet another embodiment, the apparatus further comprises:
- a frame with at least two reversing rollers over which the endless conveyor belt is arranged;
- a drive unit for driving the outer edges of the conveyor belt in the transport direction; and
- a weighing unit which is arranged under the conveyor belt and which is adapted to weigh the product flow to be transported over the conveyor belt during operation.

Because with the above described conveyor belt the pretensioning is considerably reduced compared to known conveyor belts, with sufficient traction the conveyor belt will still be able to hang substantially slack under the influence of the mass of the product flow without being impeded by pretensioning. This enables an accurate weighing of the product flow to be transported over the conveyor belt by a weighing unit arranged under the conveyor belt.

According to yet another preferred embodiment, toothed belt pulleys are arranged on the reversing rollers which can be engaged with the toothed belt situated on the outer edges of the conveyor belt. This toothed belt provides on the one hand, in combination with the toothed belt pulleys, a low-maintenance and reliable driving on the outer edge of the conveyor belt and can on the other hand provide a desired thickening, which prevents pretensioning when applied in a weighing apparatus with reversing rollers of constant diameter. It is of course also possible to prevent pretensioning in the conveyor belt by embodying the reversing rollers in the middle part with a smaller diameter than at the position of the driven outer edge.

According to a further preferred embodiment of the weighing apparatus, the weighing unit comprises a non-rotatable weighing bar or a rotatable weighing roller, both of which enable a reliable and accurate weighing of a product flow which is, if desired, continuously moving.

The invention further relates to a method for weighing a product flow, comprising the following steps of:
- driving an outer edge of an endless conveyor belt in a transport direction for the purpose of transporting the product flow thereon in transport direction, wherein a width direction extends in an imaginary transport plane substantially transversely of the transport direction, and wherein a carrying direction extends substantially transversely of the transport plane, wherein one or more transition parts are arranged slightly inward of the outer edges in the width direction, wherein a middle part is situated between the transition parts, and wherein the transition part is adapted to provide the middle part with a substantially flexible suspension in the carrying direction and/or the transport direction of the conveyor belt relative to the outer edges;
- transporting a product flow over the conveyor belt, wherein the conveyor belt hangs substantially slack as a result of the mass of the product flow; and
- weighing the product flow transported on the sagging conveyor belt with a weighing unit.

Because the belt tension in transport direction and in the carrying direction transversely of the transport direction is kept low according to the invention, there is minimal influence on the weighing signal. Even during a continuous product flow, wherein the conveyor belt is driven and therefore traction is exerted on the conveyor belt, a very high weighing accuracy of for instance 2 grams in a weight range of 20 kilograms has hereby been found viable with suitable sensors. The invention can of course also be applied in other weight ranges.

According to a preferred embodiment of the method, the outer edges comprise a toothed belt which is driven during operation by a toothed belt pulley arranged on a reversing roller of the conveyor belt.

According to a further preferred embodiment of the method, the transition part comprises openings with a parallelogram shape, and the material present between the parallelogram-shaped openings functions as pull member for transmitting a pulling force from the outer edge driven in transport direction to a middle part of the conveyor belt for the purpose of also transporting in the transport direction the middle part of the conveyor belt with the product flow to be transported.

Preferred embodiments of the present invention are further elucidated in the following description with reference to the drawing, in which.

Figure 1:
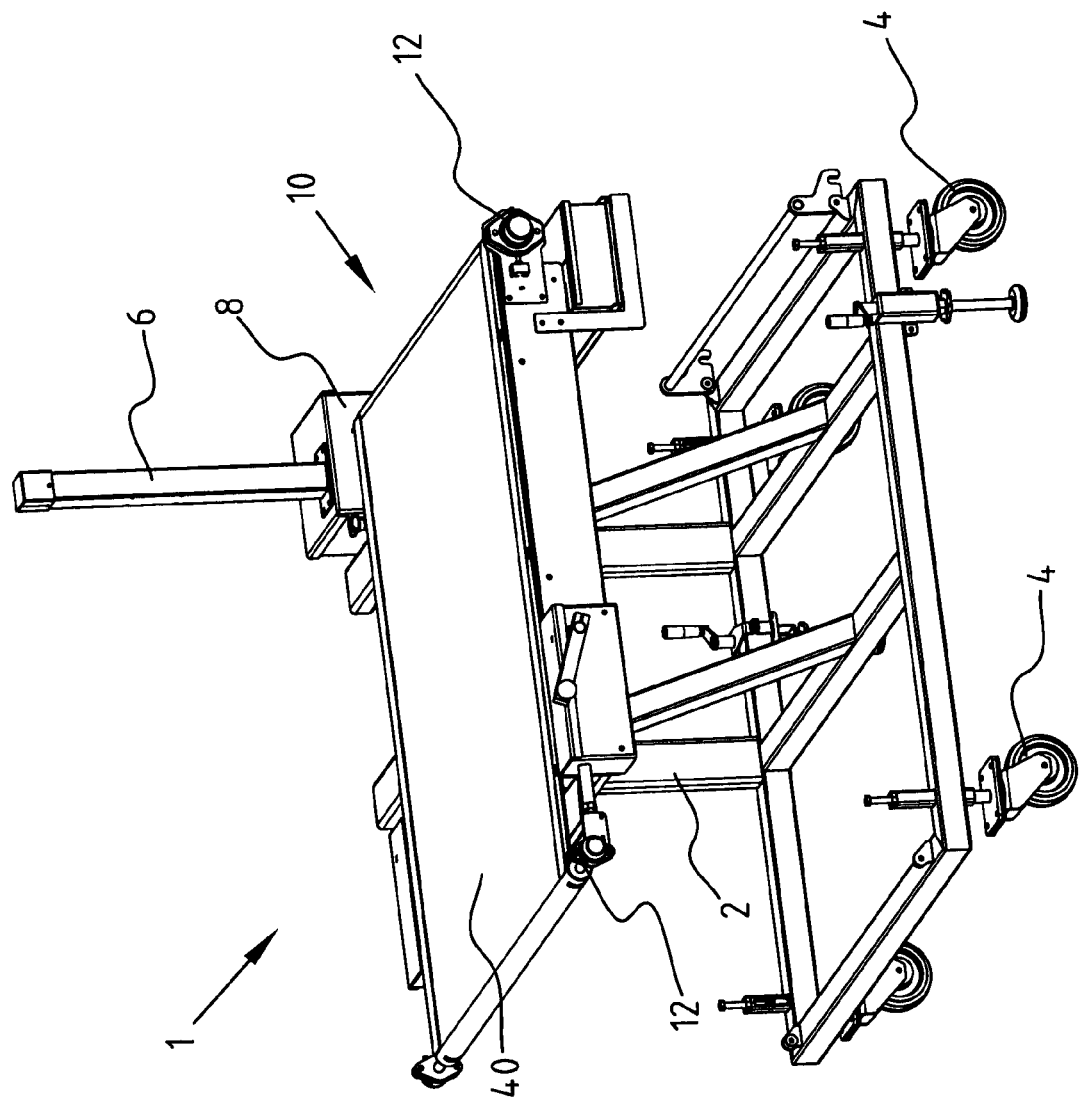
FIG. 1 is a perspective view of a weighing apparatus with conveyor belt according to the present invention.

Weighing apparatus 1 shown in FIG. 1 comprises a displaceable frame 2 provided with swivel wheels 4. A cable guide 6 is arranged on drive housing 8 for the purpose of training cables therethrough to a cable duct (not shown). Conveyor belt 10 is an endless belt arranged around two reversing rollers 12.

Figure 2:
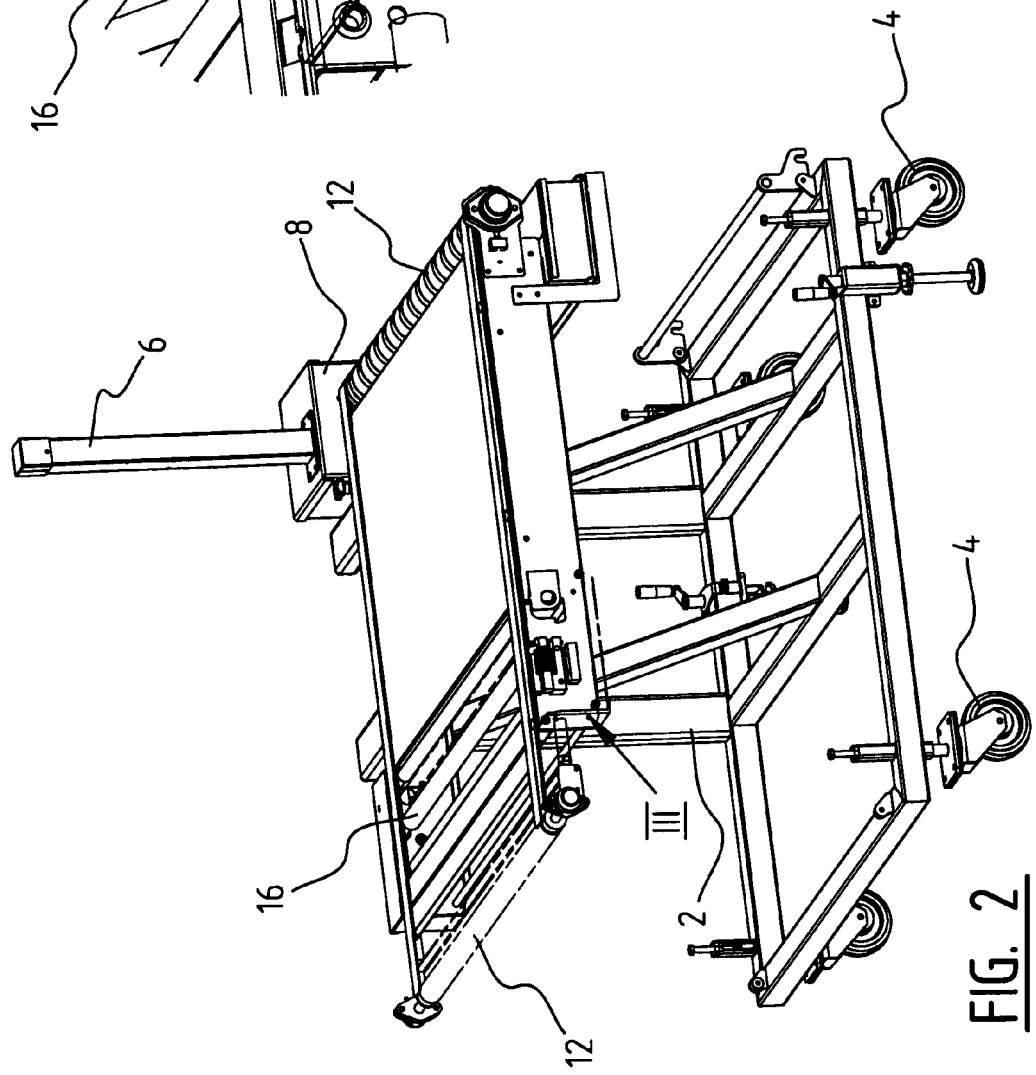
FIG. 2 is a perspective view of the apparatus shown in FIG. 1, wherein the conveyor belt is omitted.

In FIG. 2 the conveyor belt 10 is omitted, whereby reversing rollers 12 are more readily visible, as is weighing unit 14 formed by weighing bar 16.

Figure 3:
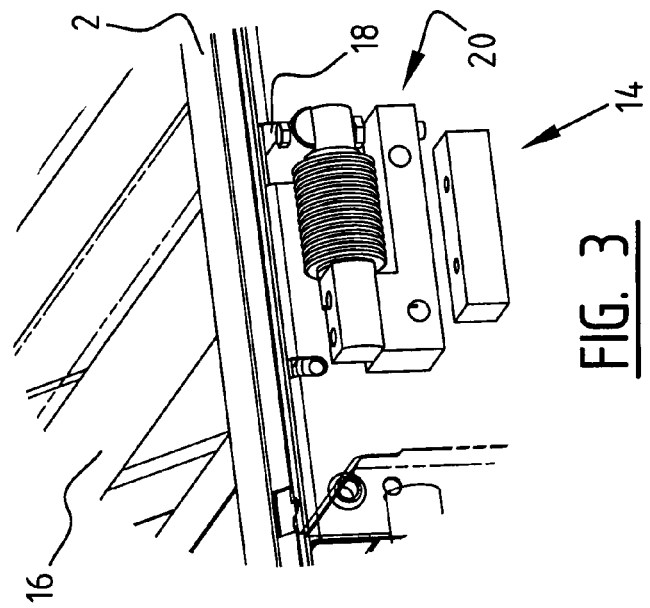
FIG. 3 is a perspective detail view of the weighing unit of the weighing apparatus shown in FIG. 2.

As shown in FIG. 3, weighing bar 16 is mounted flexibly on a weighing sensor 20 which is able to determine the mass of the product flow displacing over weighing bar 16.

Figure 4:
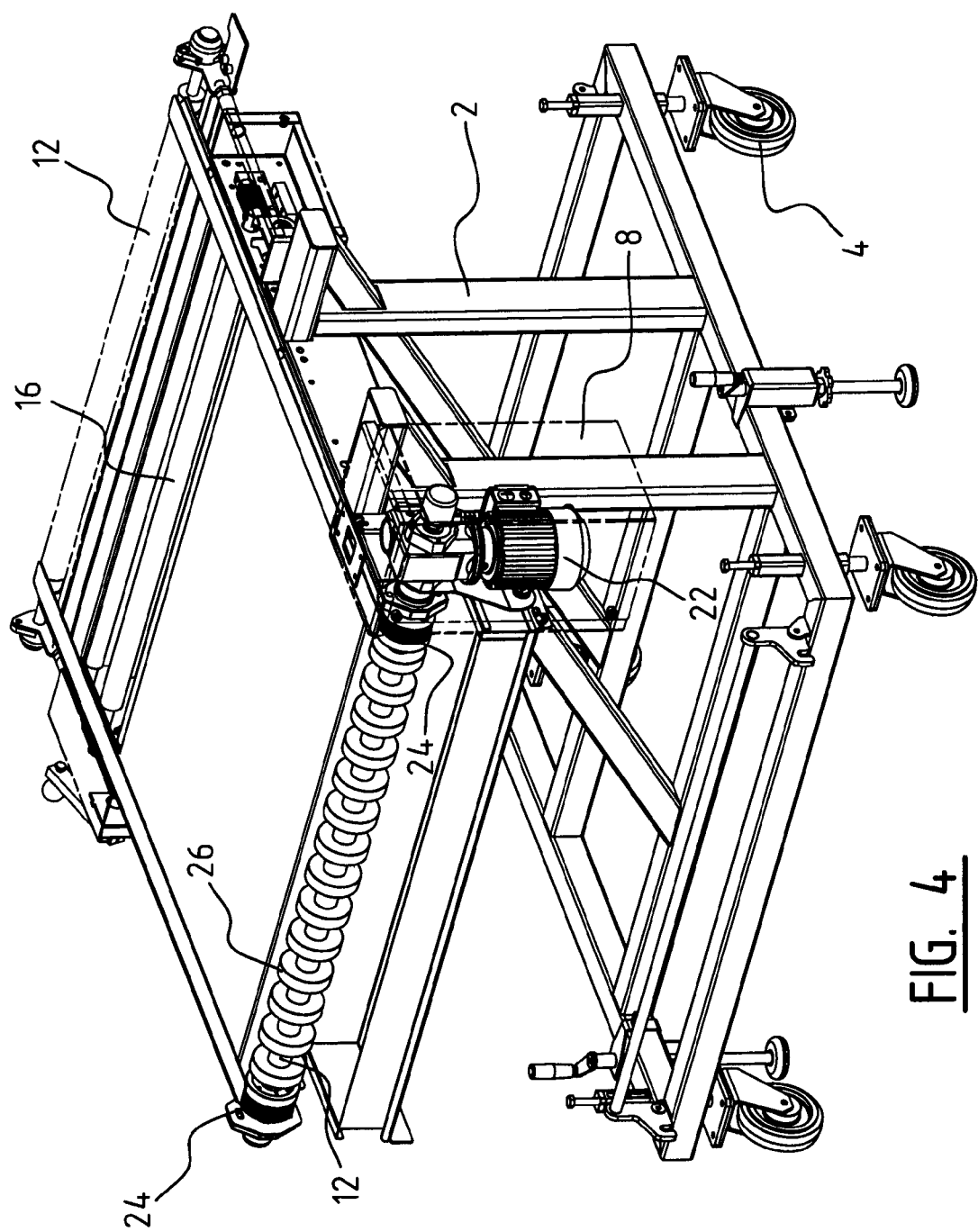
FIG. 4 is a perspective view from a different angle of the apparatus shown in FIG. 2.

FIG. 4 shows a further perspective view of weighing apparatus 1, wherein drive housing 8 is shown in transparent view. Situated in drive housing 8 is a drive motor 22 which drives one of the reversing rollers 12. This driven reversing roller 12 has close to its outer ends toothed wheel pulleys 24 with which a toothed belt 28 arranged close to the outer edges of conveyor belt 10 can be engaged. In the shown embodiment the driven reversing roller 12 further comprises a number of discs 26 over which conveyor belt 10 is guided.

Figure 5:
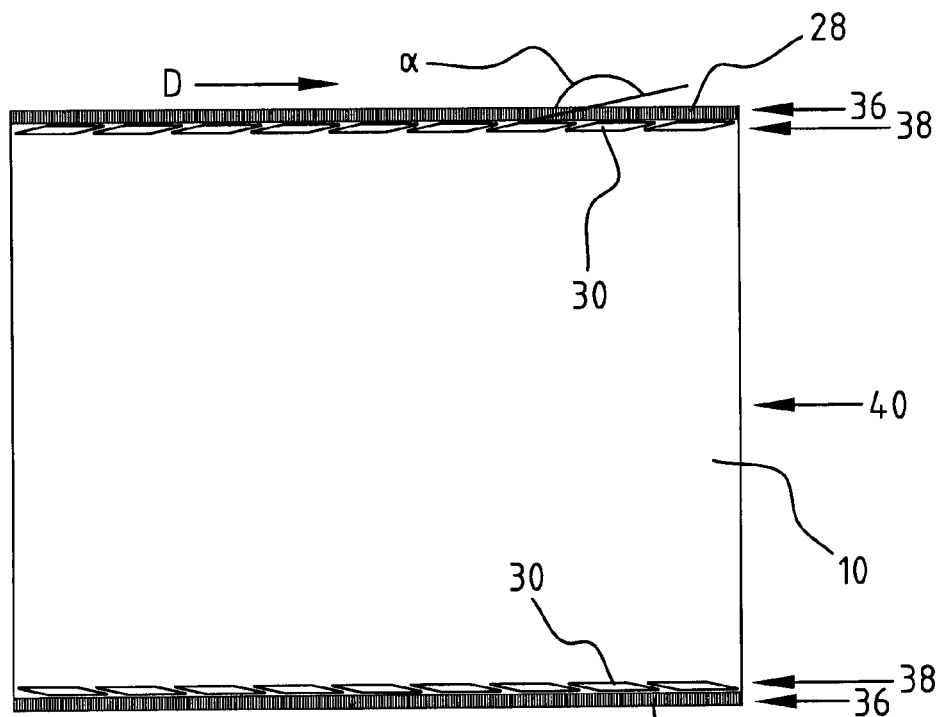
FIG. 5 shows a two-dimensional view of a conveyor belt according to the present invention.

FIG. 5 shows a two-dimensional top view of the carrying surface of conveyor belt 10. Conveyor belt 10 can be subdivided into three zones: outer edges 36, transition parts 38 and middle part 40. The embodiment shown in FIG. 5 has two transition parts 38 arranged slightly inward of outer edges 36 in the width direction of conveyor belt 10. Middle part 40, on which the product flow for weighing is carried and displaced, is situated between transition parts 38. Transition parts 38 are adapted to provide middle part 40 with a substantially flexible, or slack, suspension in the carrying direction and/or transport direction D of conveyor belt 10 relative to outer edges 36.

Figure 6:
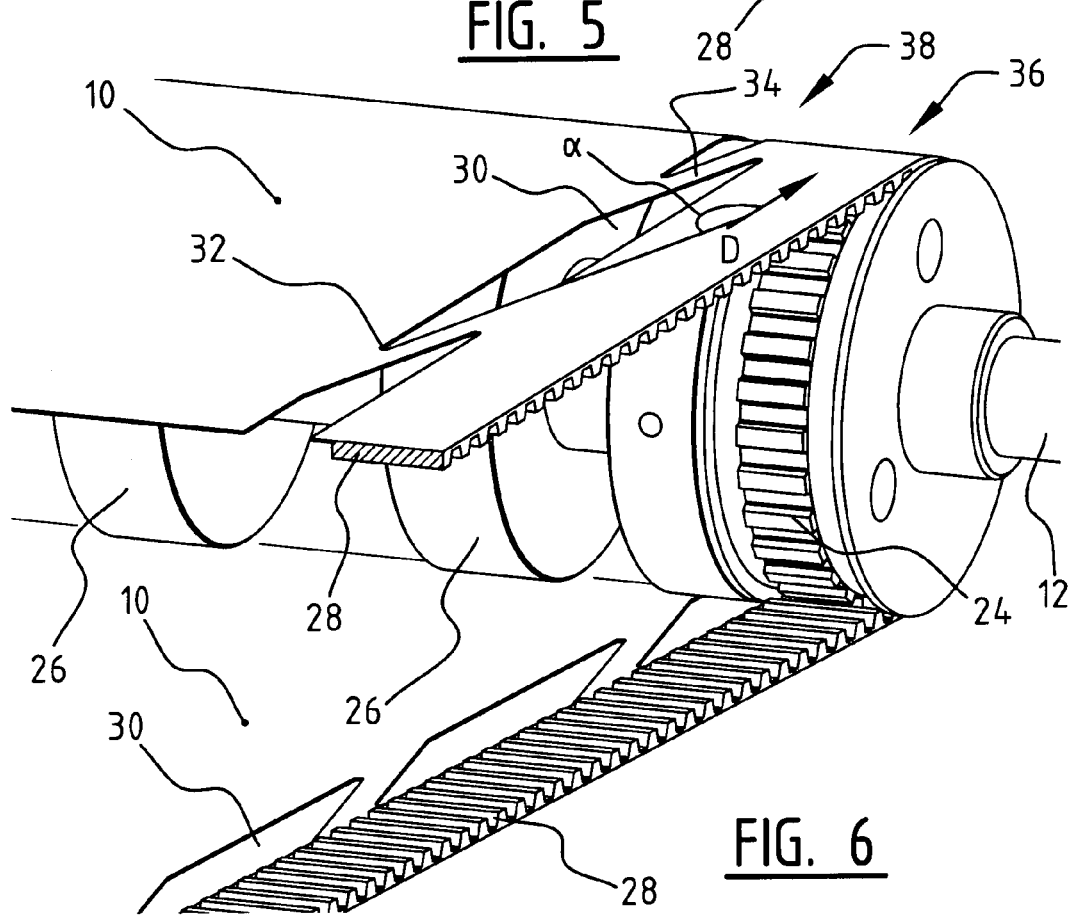
FIG. 6 is a perspective detail view of the conveyor belt close to a reversing roller.

In a preferred embodiment conveyor belt 10 is provided on outer edges 36 with a toothed belt 28 as shown in more detail in FIG. 6.

The perspective detail view of FIG. 6 shows that a toothed belt 28 situated on outer edge 36 of conveyor belt 10 engages on a toothed belt pulley 24 arranged close to the outer end of a driven reversing roller 12. Toothed belt 28 provides on the one hand a low-maintenance and reliable driving on outer edge 36 of conveyor belt 10, and can on the other hand also provide a desired thickening which, when reversing rollers 12 of a constant diameter are applied, prevents pretensioning of conveyor belt 10 in that the thickened portion provides some clearance in radial direction.

Transition parts 38, which are situated slightly inward of outer edges 36 in the width direction of conveyor belt 10, are adapted to provide middle part 40, relative to outer edges 36, with a substantially flexible, or slack, suspension in the carrying direction and/or transport direction D of conveyor belt 10. For this purpose transition part 38 is provided in the embodiment shown in FIG. 6 with parallelogram-shaped openings which locally weaken transition part 38 such that a pretensioning of middle part 40 of conveyor belt 10 is prevented. The material 34 present between the parallelogram-shaped openings 30 arranged in conveyor belt 10 is however strong enough to function as a pull member, and thus transmit a displacement of the drivable outer edge 36 of conveyor belt 10 to middle part 40 of conveyor belt 10 on which the product flow is being transported.

The parallelogram shape of openings 30 is particularly favourable for the slack suspension of middle part 40 relative to outer edges 36. Material 34 present between openings 30 can be oriented at angle α such that the drive force exerted on outer edge 36 of conveyor belt 10 can be resolved into vector components such that the drive force is transmitted by the material parts 34 functioning as pull members from outer edge 36 onto middle part 40 of conveyor belt 10.

The angle α between the material 34 present between adjacent parallelogram-shaped openings 30 and the transport direction D in which conveyor belt 10 is driven lies in the range between 90° and 180°, which means that the material 34 serving as pull member extends rearward relative to transport direction D.

In a particularly favourable embodiment the angle α lies in the range 155°-170°, since at this angle the drive force exerted on outer edge 36 of conveyor belt 10 is resolved into vector components in very favourable manner and is transmitted from outer edge 36 by pull members 34 onto middle part 40 of conveyor belt 10. At an angle α in the range 155°-170° the resolved component of the drive force exerted on outer edge 36 oriented in width direction of conveyor belt 10 is so small that a pretensioning in the width direction of conveyor belt 10 is also largely prevented, this having a positive influence on the attainable weighing accuracy.

The width of the material 34 between two adjacent parallelogram-shaped openings 30 is a further parameter with which the degree of elimination of the pretensioning of middle part 40 of conveyor belt 10 can be controlled.

In a preferred embodiment the corners 32 of the parallelogram-shaped opening 30 are rounded in order to prevent peak stresses which could result in tearing.

It is noted that, although the shown embodiment comprises parallelogram-shaped openings 30 in transition part 38, other embodiments are also possible. These alternative embodiments can for instance comprise openings of another shape, although it is also possible to envisage the transition part 38 comprising a strip of material which is more flexible and/or more elastic than the material of conveyor belt 10.

Although they show preferred embodiments of the invention, the above described embodiments are intended only to illustrate the present invention and not in any way to limit the specification of the invention. It is particularly noted that the skilled person can combine technical measures of the different embodiments, such as for instance combining a flexible strip of material with openings in transition part 38 of conveyor belt 10. The scope of the invention is therefore defined solely by the following claims.

The invention claimed is:

1. Apparatus for weighing a product flow, comprising:
   an endless conveyor belt for transporting the product flow thereon in a transport direction D, wherein a width direction extends in an imaginary transport plane substantially transversely of the transport direction, and wherein a carrying direction extends substantially transversely of the transport plane,
   wherein the conveyor belt includes two drivable outer edges and at least one transition part arranged slightly inward of the drivable outer edges of the conveyor belt in the width direction,
   wherein a middle part is situated between the drivable outer edges, and
   wherein the transition part is adapted to provide the middle part with a substantially flexible suspension in the carrying direction and/or the transport direction of the conveyor belt relative to the drivable outer edges.

2. Apparatus as claimed in claim 1, wherein the outer edges of the conveyor belt are strengthened.

3. Apparatus as claimed in claim 2, wherein the outer edges comprise a thickened portion.

4. Apparatus as claimed in claim 1, wherein at least one of the outer edges comprise a toothed belt.

5. Apparatus as claimed in claim 1, wherein the transition part comprises openings.

6. Apparatus as claimed in claim 5, wherein the openings comprise a parallelogram shape.

7. Apparatus as claimed in claim 5, wherein the material present between adjacent parallelogram-shaped openings comprises a pull member which is adapted to transmit a pulling force from a respective drivable outer edge drivable in transporting direction D onto the middle part of the conveyor belt, in order to also make the middle part of the conveyor belt with the product flow for transporting drivable in the transport direction.

8. Apparatus as claimed in claim 7, wherein the material present between adjacent parallelogram-shaped openings comprises a pull member which forms an angle between 90° and 180° with the transport direction D.

9. Apparatus as claimed in claim 1, wherein the transition part comprises a strip of material which is more flexible and/or more elastic than the material of the conveyor belt.

10. Apparatus as claimed in claim 1, further comprising:
    a frame with at least two reversing rollers over which the endless conveyor belt is arranged;
    a drive unit for driving the outer edges of the conveyor belt in the transport direction D; and
    a weighing unit which is arranged under the conveyor belt and which is adapted to weigh the product flow to be transported over the conveyor belt.

11. Apparatus as claimed in claim 10, wherein toothed belt pulleys are arranged on the reversing rollers which can be engaged with the toothed belt situated on the outer edges of the conveyor belt.

12. Method for weighing a product flow, comprising the following steps of:
    driving an outer edge of an endless conveyor belt in a transport direction D for the purpose of transporting the product flow thereon in transport direction, wherein a width direction extends in an imaginary transport plane substantially transversely of the transport direction, and wherein a carrying direction extends substantially transversely of the transport plane, wherein at least one transition part is arranged slightly inward of a respective drivable outer edge of the conveyor belt in the width direction, wherein a middle part is situated between the drivable outer edges of the conveyor belt, and wherein the transition part is adapted to provide the middle part with a substantially flexible suspension in the carrying direction and/or the transport direction of the conveyor belt relative to the outer edges;

transporting a product flow over the conveyor belt, wherein the conveyor belt hangs substantially slack as a result of the mass of the product flow; and weighing the product flow transported on the sagging conveyor belt with a weighing unit.

13. Method as claimed in claim 12, wherein the respective outer edge comprises a toothed belt which is driven during operation by a toothed belt pulley arranged on a reversing roller of the conveyor belt.

14. Method as claimed in claim 12, wherein the transition part comprises openings with a parallelogram shape, and the material present between the parallelogram-shaped openings functions as pull member for transmitting a pulling force from the respective outer edge driven in transport direction to a middle part of the conveyor belt for the purpose of also transporting in the transport direction the middle part of the conveyor belt with the product flow to be transported.

15. Method as claimed in claim 12, further comprising the step:

providing an apparatus for weighing a product flow, comprising an endless conveyor belt for transporting the product flow thereon in a transport direction D, wherein a width direction extends in an imaginary transport plane substantially transversely of the transport direction, and wherein a carrying direction extends substantially transversely of the transport plane, wherein the conveyor belt includes two drivable outer edges and at least one transition part arranged slightly inward of the drivable outer edges of the conveyor belt in the width direction, wherein a middle part is situated between the drivable outer edges, and wherein the transition part is adapted to provide the middle part with a substantially flexible suspension in the carrying direction and/or the transport direction of the conveyor belt relative to the drivable outer edges.

16. Method as claimed in claim 12, wherein the transition part comprises openings, and wherein adjacent openings define a pull member interconnecting a respective outer edge with the middle part.

17. Apparatus as claimed in claim 16, wherein the pull member extends at an oblique angle relative to the transport direction.

18. Apparatus as claimed in claim 5, wherein adjacent openings define a pull member interconnecting a respective outer edge with the middle part.

19. Apparatus as claimed in claim 18, wherein the pull member extends at an oblique angle relative to the transport direction.

* * * * *